(12) United States Patent
Zhu (10) Patent No.: US 8,369,894 B1
(45) Date of Patent: Feb. 5, 2013

(54) CONFIRMING CERTIFICATION OF COMBINATIONS OF SECURE ELEMENTS AND MOBILE DEVICES

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 711 days.

(21) Appl. No.: 12/348,374

(22) Filed: Jan. 5, 2009

(51) Int. Cl.
*H04B 1/38* (2006.01)
*G06K 19/06* (2006.01)

(52) U.S. Cl. ......... 455/558; 235/492; 235/380; 705/67
(58) Field of Classification Search .................. 455/558
See application file for complete search history.

(56) References Cited

U.S. PATENT DOCUMENTS

| | | | | | |
|---|---|---|---|---|---|
| 5,384,834 | A * | 1/1995 | Sato et al. | ................. | 379/88.21 |
| 5,396,558 | A * | 3/1995 | Ishiguro et al. | ................. | 705/67 |
| 5,396,650 | A * | 3/1995 | Terauchi | ................. | 340/7.4 |
| 5,987,438 | A * | 11/1999 | Nakano et al. | ................. | 705/41 |
| 6,032,055 | A * | 2/2000 | Yazaki et al. | ................. | 455/558 |
| 6,044,470 | A * | 3/2000 | Kuriyama | ................. | 726/19 |
| 6,223,984 | B1 * | 5/2001 | Renner et al. | ................. | 235/380 |
| 6,536,661 | B1 * | 3/2003 | Takami et al. | ................. | 235/379 |
| 6,603,968 | B2 * | 8/2003 | Anvekar et al. | ................. | 455/433 |
| 7,516,479 | B2 * | 4/2009 | Kurita | ................. | 726/2 |
| 7,650,647 | B1 * | 1/2010 | Hansmann et al. | ................. | 726/34 |
| 8,074,271 | B2 * | 12/2011 | Davis et al. | ................. | 726/16 |
| 2001/0029579 | A1 * | 10/2001 | Kusakabe et al. | ................. | 713/172 |
| 2003/0006280 | A1 * | 1/2003 | Seita et al. | ................. | 235/380 |
| 2005/0167512 | A1 * | 8/2005 | Minemura et al. | ................. | 235/492 |
| 2007/0119952 | A1 * | 5/2007 | Morimoto et al. | ................. | 235/492 |
| 2007/0272752 | A1 * | 11/2007 | Nakatsugawa et al. | ........ | 235/451 |
| 2008/0016004 | A1 * | 1/2008 | Kurasaki et al. | ................. | 705/67 |
| 2009/0042613 | A1 * | 2/2009 | Anzai | ................. | 455/558 |
| 2009/0164799 | A1 * | 6/2009 | Takagi | ................. | 713/186 |
| 2009/0247123 | A1 * | 10/2009 | Lee et al. | ................. | 455/410 |
| 2009/0318190 | A1 * | 12/2009 | Shinozaki | ................. | 455/558 |
| 2010/0082572 | A1 * | 4/2010 | Arora et al. | ................. | 707/706 |
| 2010/0205432 | A1 * | 8/2010 | Corda et al. | ................. | 713/159 |
| 2010/0287380 | A1 * | 11/2010 | Kurimoto et al. | ................. | 713/181 |

FOREIGN PATENT DOCUMENTS

JP 2005202497 A * 7/2005

* cited by examiner

*Primary Examiner* — Temesgh Ghebretinsae
*Assistant Examiner* — Gennadiy Tsvey (57) ABSTRACT

A system is provided for confirming certification of combinations of secure elements and mobile devices. The system includes secure element data and a secure element component on a removable secure element. The secure element component detects insertion of the removable secure element in a mobile device, retrieves the secure element data, and retrieves mobile device data from the mobile device. The secure element component determines whether a combination of the removable secure element and the mobile device is certified based on a comparison of the secure element data and the mobile device data. The secure element component provides a certification alert via a user interface on the mobile device in response to a determination that the combination of the removable secure element and the mobile device is not certified.

14 Claims, 5 Drawing Sheets

CONFIRMING CERTIFICATION OF COMBINATIONS OF SECURE ELEMENTS AND MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Transaction devices are portable items that store data, such as credit cards, debit cards, gift cards, access cards, and cards for various prepaid services or goods. Magnetically encoded transaction devices typically store data in a magnetic strip. "Smart cards" are transaction devices that store data in non-volatile memory, and typically contain data processing circuitry that offers some degree of computing capacity.

A smart card may be a "proximity read" transit card, which may communicate with a card reader without physically contacting the card reader. Communication between a proximity read smart card and various types of card readers may occur via a radio frequency signal, optical signal, wireless Internet connection, or other communication method known in the art or hereafter developed. As an owner or a user of a smart card passes through a fare gate, a card reader may cause value to be automatically deducted from value stored on the smart card.

A mobile device, such as a mobile phone, may include a smart card. Thus, if a card reader is present at a location where commercial transactions occur or where proximity read smart cards are used, the smart card in the mobile device may make payments, provide access to restricted areas, and perform other functions or transactions typically performed by smart cards. A mobile device may implement the functionality of multiple smart cards by containing a super-smart card, a smart card that emulates or enables multiple smart cards by containing multiple smart card applications. A smart card application is the software, hardware, or combination of both that provides the capability of a smart card. Multiple smart card applications on a smart card enable the smart card to emulate multiple smart cards.

SUMMARY

In some embodiments, a system is provided for confirming certification of combinations of secure elements and mobile devices. The system includes secure element data and a secure element component on a removable secure element. The secure element component detects insertion of the removable secure element in a mobile device, retrieves the secure element data, and retrieves mobile device data from the mobile device. The secure element component determines whether a combination of the removable secure element and the mobile device is certified based on a comparison of the secure element data and the mobile device data. The secure element component provides a certification alert via a user interface on the mobile device in response to a determination that the combination of the removable secure element and the mobile device is not certified.

In some embodiments, a method is provided for confirming certification of combinations of secure elements and mobile devices. Insertion of a removable secure element in a mobile device is detected. Secure element data is retrieved from the removable secure element. Mobile device data is retrieved from the mobile device. Whether a combination of the removable secure element and the mobile device is certified is determined based on a comparison of the secure element data and the mobile device data. A certification alert is provided via a user interface on the mobile device in response to a determination that the combination of the removable secure element and the mobile device is not certified.

In some embodiments, a system is provided for confirming certification of combinations of secure elements and mobile devices. The system includes mobile device data and a mobile device component on a mobile device. The mobile device component detects insertion of a removable secure element in the mobile device, retrieves secure element data from the removable secure element, and retrieves the mobile device data. The mobile device component determines whether a combination of the removable secure element and the mobile device is certified based on a comparison of the secure element data and the mobile device data. The mobile device component also provides a certification alert via a user interface on the mobile device in response to a determination that the combination of the removable secure element and the mobile device is not certified.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Before permitting various types and models of smart cards to be inserted into various types and models of mobile devices, smart card providers and/or mobile device providers may test combinations of smart cards with mobile devices. These tests insure not only compatibility and performance, but also confirm security standards are met to reduce the possibility of fraudulent smart card transactions. These providers may verify that smart card transactions may be properly executed in a timely manner because the providers do not want their customers to have unsatisfactory experiences using smart card applications in mobile devices. Such unsatisfactory experiences may lead to the customers reflecting negatively on the smart card application providers, the mobile device providers, and/or mobile device service providers.

Removable smart cards, or removable secure elements, create challenges for certification. For example, a mobile phone user takes the removable secure element from their mobile phone for which the removable secure element is certified, and inserts this element into a family member's mobile phone so that the family member may use this element with their own mobile phone to make a credit card transaction. The removable secure element provider and the mobile phone provider may not have certified the combination of the family member's model device with the removable secure element. Even if this combination has been certified, this certification may have occurred around the time that the model of the family member's mobile device was first manufactured, which may be long after the removable secure element was manufactured.

Some embodiments of the present disclosure install both a secure element component and data that identifies the mobile devices that are certified for a removable secure element on the removable secure element. When the secure element component detects insertion of the removable secure element in a mobile device, the secure element component retrieves the data and identifies the type or model of the mobile device. The secure element component compares the data with the mobile device model to determine whether the mobile device is certified for the removable secure element. If the mobile device model is not included in the data, the secure element component may communicate with a sever via the mobile device to update the data and determine if the mobile device has recently been certified for the removable secure element. If the mobile device model is not included in the data or the updated data, the secure element component provides a certification alert to a user interface on the mobile device. The alert may inform the mobile device user that the mobile device is not certified for the removable secure element and/or that access to some smart card applications on the removable secure element may be restricted.

A component and data installed on the mobile device may also confirm certification of a combination. The mobile device data identifies the removable secure elements that are certified for the mobile device. When the mobile device component detects insertion of a removable secure element in the mobile device, the mobile device component retrieves the data and identifies the type or model of the removable secure element. The mobile device component compares the data with the removable secure element model to determine whether the removable secure element is certified for the mobile device. If the removable secure element is not included in the data, the mobile device component may communicate with a sever via the mobile device to update the data and determine if the removable secure element has recently been certified for the mobile device. If the secure element identifier is not included in the data or the updated data, the mobile device component provides a certification alert to the user interface on the mobile device. The certification alert may inform the mobile device user that the removable secure element is not certified for the mobile device and/or that access to some smart card applications on the removable secure element may be restricted. Each of the smart card applications on the removable secure element may provide only restricted access in response to either the secure element component or the mobile device component determining that the removable secure element is not certified for the mobile device. The user may enter information, such as a personal identification number (PIN), to enable access to restricted smart card applications.

Figure 1:
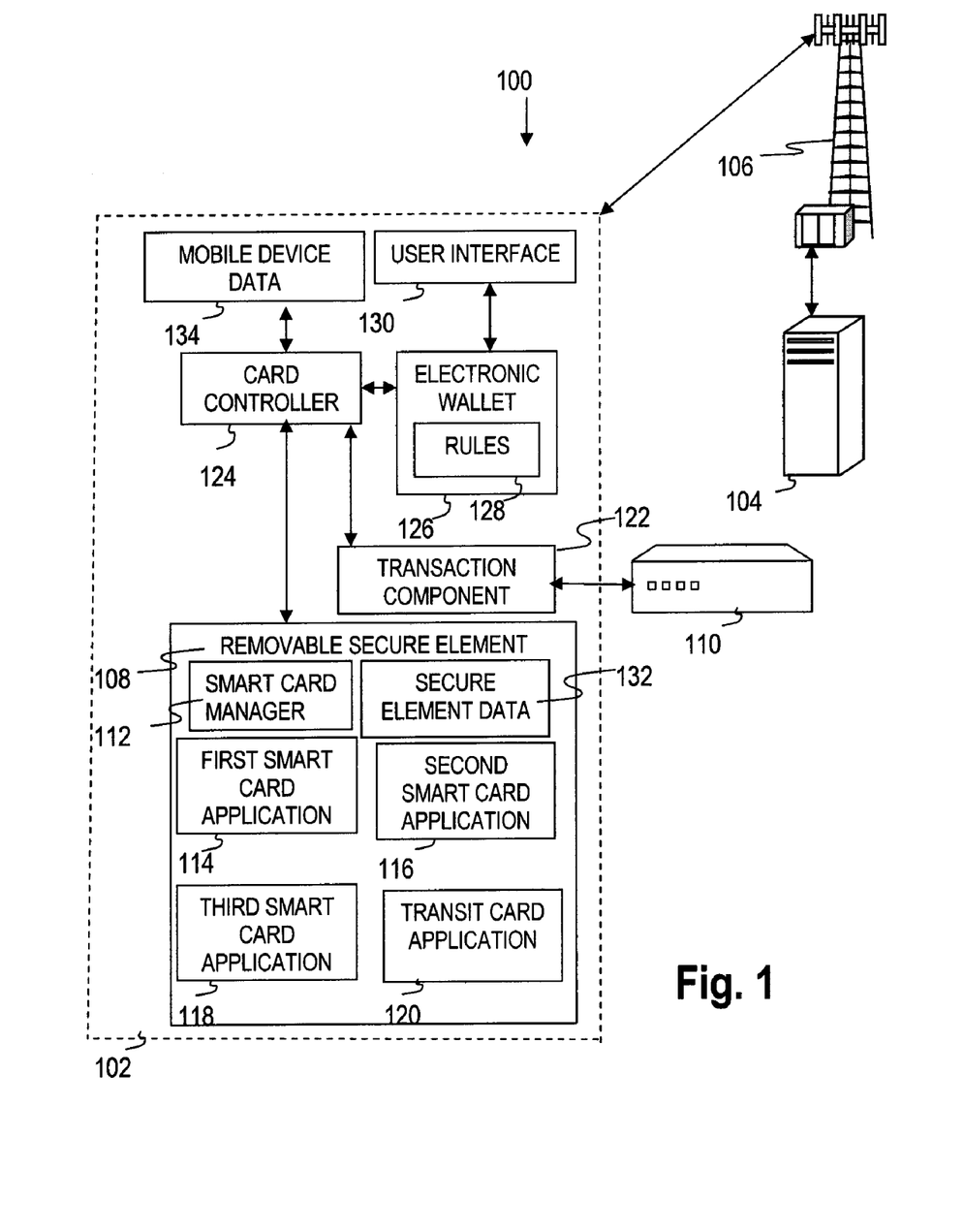
FIG. 1 shows a block diagram of a system for confirming certification of combinations of secure elements and mobile devices according to some embodiments of the present disclosure.

FIG. 1 shows a block diagram of a system 100 for confirming certification of combinations of secure elements and mobile devices according to an embodiment of the present disclosure. The system 100 includes a mobile device 102 that communicates with a server 104 via a base transceiver station (BTS) 106. The mobile device 102 includes a removable secure element 108 that enables smart card transactions with a card reader 110.

The removable secure element 108 may be a smart card, a security information management (SIM) component, or other type of security device. The removable secure element 108 may include a smart card manager 112 to assist a mobile device owner or user in managing smart card applications for a transaction, such as a first smart card application 114, a second smart card application 116, a third smart card application 118, and a transit card application 120. The smart card applications 114-118 can be either a loyalty card, an identification card, a credit card, a security card, a debit card, a bank account card, or a cash card. The transit card application 120 is a smart card application that can include digital cash. While four smart card applications 114-120 are shown in FIG. 1, other numbers are also contemplated.

The mobile device 102 may include a transaction component 122, such as a radio frequency (RF) transaction component, to enable the removable secure element 108 to communicate with a vendor device by radio frequency, optical, infrared, wired, magnetic "contact reader," or other known or hereafter developed communications. The vendor device may be point-of-sale, security, or any other vendor transaction device, such as the card reader 110. The security for the removable secure element 108 may be enabled by hardware or software components on the mobile device 102, by hardware or software components of the removable secure element 108, or combinations of any or all.

The ISO/IEC 7816 and ISO/IEC 7810 series of standards for contact smart cards define: the physical shape, the positions and shapes of the electrical connectors, the electrical characteristics, the communications protocols, the format of the commands sent to the card and the responses returned by the card, robustness of the card, and the functionality. The standard for contactless smart card communications is ISO/IEC 14443, dated 2001. An alternative standard for contactless smart cards is ISO 15693, which allows communications at distances up to 50 cm. However, systems applying other standards may be used and are within the spirit and scope of the present disclosure.

The mobile device 102 contains a card controller 124 and an electronic wallet 126. The card controller 124 may enable the electronic wallet 126 to communicate with the smart card manager 112. The card controller 124 is responsible for accessing the hardware registers of the smart card manager 112 and often includes an interrupt handler to service interrupts generated by the smart card manager 112. The electronic wallet 126 is an application that, in addition to providing the mobile device user with information regarding the smart card applications 114-120, may enable the user to access and select the smart card applications 114-120 for use in carrying out transactions. In some embodiments, the electronic wallet 126 contains or has access to a set of context-based rules 128. The electronic wallet 126 may process the rules 128 and context information to determine which of the smart card applications 114-120 are appropriate for a transaction.

The mobile device 102 may also include a user interface 130, which enables an owner or user of the mobile device 102 to enter input to and receive output from the mobile device 102. The mobile device 102 may also communicate with the server 104 to assist an owner in managing the smart card applications 114-120. The server 104 can operate automatically, function with human intervention as part of a customer service system, or any combination thereof. The mobile device 102, the user interface 130, and the server 104 are described in more detail below in reference to FIG. 3 to FIG. 6.

Secure element data 132, which includes data that identifies the mobile devices 102 that are certified for the removable secure element 108, and a secure element component may be installed on the removable secure element 108 for determining whether the mobile device 102 is certified for the removable secure element 108. Although the present disclosure describes the smart card manager 112 as providing the function of the secure element component, the secure element component may be separate from the smart card manager 112, or the functions of the secure element component may be provided partially by the smart card manager 112 and partially by a separate secure element component. The secure element data 132 may include a secure element identifier for the removable secure element 108, for example a make and model of secure element, and data that identifies the mobile devices 102 that are certified for the removable secure element 108.

Mobile device data 134, which includes data that identifies the removable secure elements 108 that are certified for the mobile device 102, and a mobile device component may be installed on the mobile device 102 for determining whether the removable secure element 108 is certified for the mobile device 102. Although the present disclosure describes the card controller 124 as providing the function of the mobile device component, the mobile device component may be separate from the card controller 124, or the functions of the mobile device component may be provided partially by the card controller 124 and partially by a separate mobile device component. The mobile device data 134 may also include a mobile device identifier for the mobile device 102, for example a make and model of the mobile device, in addition to the data that identifies the removable secure elements 108 that are certified for the mobile device 102.

When the smart card manager 112 detects insertion of the removable secure element 108 in the mobile device 102, the smart card manager 112 retrieves and compares the secure element data 132 and the mobile device data 134 to determine whether the combination of the removable secure element 108 and the mobile device 102 is certified. If the smart card manager 112 determines that the combination is not certified, the smart card manager 112 may request the server 104 to update the secure element data 132 so the smart card manager 112 can make another comparison based on the most updated data. Additionally, the mobile device 102 may periodically request the server 104 to update the secure element data 132 and/or the mobile device data 134. If one or two comparisons indicate that the combination is certified, the mobile device user may use the removable secure element data 132 inserted in the mobile device 102. If one or two comparisons indicate that the combination is not certified, the smart card manager 112 may provide a certification alert to the user interface 130 that informs the mobile device user that the combination of the removable secure element 108 and the mobile device 102 is not certified.

The smart card manager 112 may request user confirmation of the certification alert and store any user confirmation. If the mobile device user uses the removable secure element 108 inserted in the mobile device 102 despite the certification alert, the confirmation may serve to relieve the removable secure element provider and/or the mobile device provider of liability for problems due to the lack of certification.

If the combination is not certified, the smart card manager 112 or some of the smart card applications 114-120 may restrict access by the mobile device 102 to some of the smart card applications 114-120. For example, the smart card manager 112 may require access enabling information, such as entry of a PIN, to access some of the smart card applications 114-120. In another example, the smart card manager 112 may suspend use of some of the smart card applications 114-120. The smart card manager 112 can have the option of suspending the use of only the smart card applications 114-120 that are not protected by a requirement for access enabling information, such as entry of a PIN. The mobile device owner may have selected to protect major credit cards by requiring a PIN to prevent expensive purchases if the mobile device 102 is lost or stolen. However, the mobile device owner may have also selected to not protect the transit card application 120 with a PIN requirement because the mobile device owner wants to quickly access a subway system without having to stop and enter a PIN. Additionally, the mobile device owner may have also selected to not protect the third smart card application 118 with a PIN requirement because the mobile device user wants to conveniently purchase coffee at a coffee shop with the third smart card application 118, which has a maximum value of only $25.00. The smart card manager 112 may require enabling information only for approving purchases over a specified amount by some of the smart card applications 114-120. The mobile device owner may use this option to prevent unauthorized expenses over a certain amount, such as for example if the mobile device owner loans his removable secure element 108 to a child or friend, but has authorized only an inexpensive purchase.

Likewise, the card controller 124 may detect insertion of the removable secure element 108 in the mobile device 102, and both retrieve and compare the secure element data 132 and the mobile device data 134 to determine whether a combination of the removable secure element 108 and the mobile device 102 is certified. The card controller 124 may also request the server 104 to update the secure element data 132 so the card controller 124 can make another comparison based on the most updated data.

If one or two comparisons indicate that the combination is not certified, the card controller 124 may provide a certification alert, request user confirmation of the certification alert, and store any user confirmation. If the combination is not certified, the card controller 124 or some of the smart card applications 114-120 may similarly restrict access by the mobile device 102 to some of the smart card applications 114-120. The card controller 124 may restrict access to the smart card applications 114-120 by disabling an application program interface to the removable secure element 108 and/or disabling communication between the removable secure element 108 and the transaction component 122.

The server 104 may occasionally update the secure element data 132 and/or the mobile device data 134, such as during non-peak communication hours when the mobile device 102 is not communicating, to keep current with the latest certifications of combinations. The server 104 may update the secure element data 132 and/or the mobile device data 134 each time that a transaction is executed by one of the smart card applications 114-120.

Figure 2:
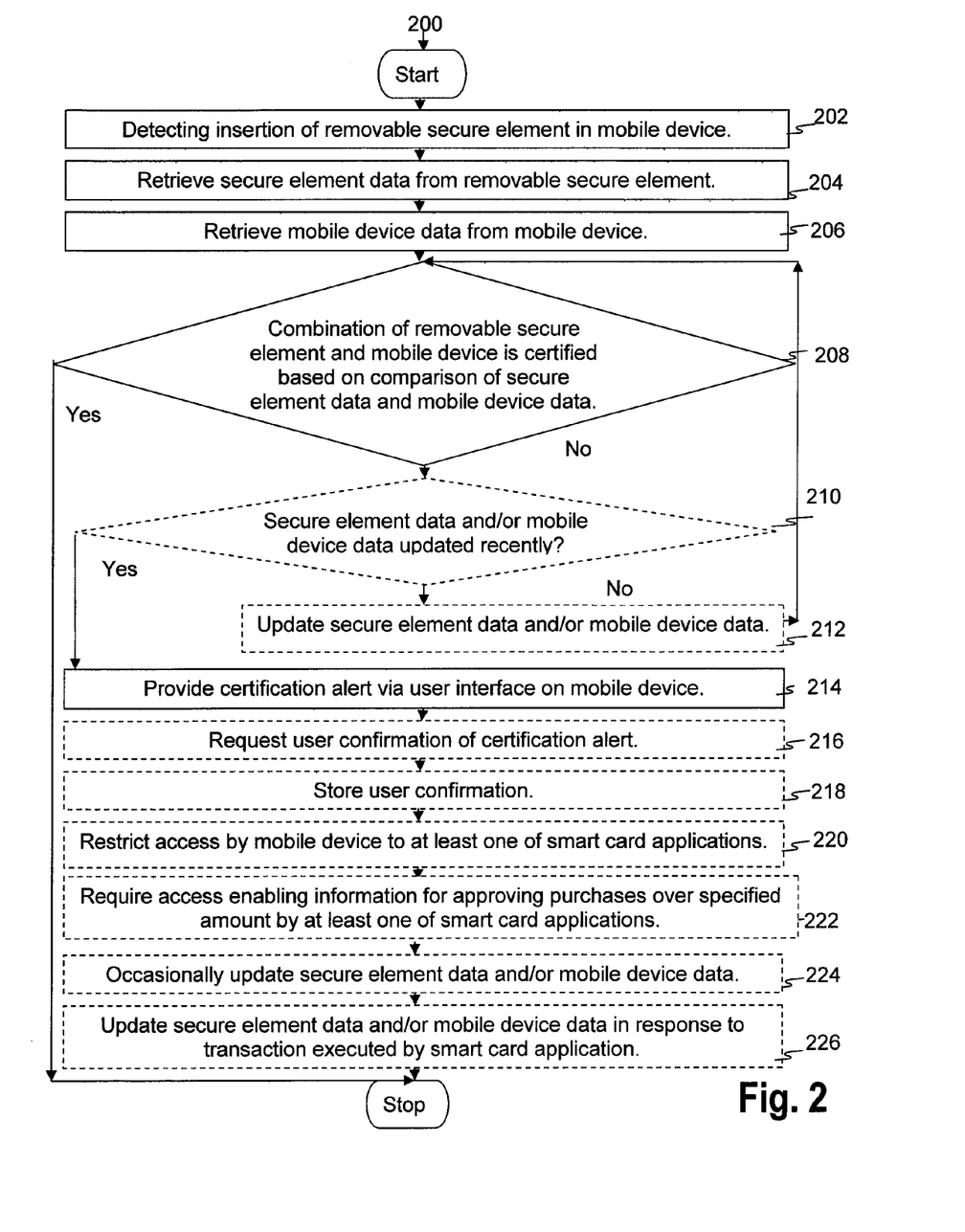
FIG. 2 shows a flowchart of a method for confirming certification of combinations of secure elements and mobile devices according to some embodiments of the present disclosure.

FIG. 2 is a flowchart illustrating a method 200 of confirming certification of combinations of secure elements and mobile devices according to an embodiment of the present disclosure. A mobile device owner may use the method 200 to determine that the combination of the removable secure element 108 and the mobile device 102 in which the owner has inserted the removable secure element 108 is certified.

In box 202, insertion of a removable secure element in a mobile device is detected. For example, the smart card manager 112 detects insertion of the removable secure element 108 in the mobile device 102.

In box 204, secure element data is retrieved from a removable secure element. For example, the smart card manager 112 retrieves the data that identifies the mobile devices 102 that are certified for the removable secure element 108.

In box 206, mobile device data is retrieved from the mobile device. For example, the smart card manager 112 retrieves the mobile device identifier for the mobile device 102.

In box 208, whether a combination of the removable secure element and the mobile device is certified is determined based on a comparison of the secure element data and the mobile device data. For example, the smart card manager 112 compares the data that identifies the mobile devices 102 that are certified for the removable secure element 108 with the mobile device data identifier to determine whether the combination of the removable secure element 108 and the mobile device 102 is certified. If the smart card manager 112 determines that the combination of the removable secure element 108 and the mobile device 102 is certified, the method 200 terminates. If the smart card manager 112 determines that the combination of the removable secure element 108 and the mobile device 102 is not certified, the method 200 continues to box 210 to determine whether data has been recently updated.

In box 210, whether the secure element data and/or the mobile device data have been updated recently is optionally determined. For example, the smart card manager 112 determines whether the secure element data 132 has been updated within the last 12 hours or within some other effective time interval. If the smart card manager 112 determines that the secure element data 132 has not been updated recently, the method 200 continues to box 212 to update the data. If the smart card manager 112 determines that the secure element data 132 has been updated recently, the method 200 proceeds to box 214 to provide a certification alert.

In box 212, at least one of the secure element data and the mobile device data is optionally updated. For example, in response to an update request from the smart card manager 112, the server 104 updates the secure element data 132, including the data that identifies the mobile devices 102 that are certified for the removable secure element 108. The method 200 returns to box 208 to compare the updated data.

In box 214, a certification alert is provided via a user interface on the mobile device. For example, the smart card manager 106 provides a certification alert to the user interface 130.

In box 216, user confirmation is optionally requested of the certification alert. For example, the smart card manager 112 requests user confirmation of the certification alert.

In box 218, the user confirmation is optionally stored. For example, the smart card manager 112 stores the user confirmation.

In box 220, access by the mobile device to at least one of smart card applications is optionally restricted. For example, the smart card manager 112 restricts access by the mobile device 102 to the smart card applications 114-118.

In box 222, access enabling information is optionally required for approving purchases over specified amount by at least one of smart card applications. For example, the smart card manager 112 requires the entry of a PIN for approving purchases over a thousand dollars by the first smart card application 114.

In box 224, secure element data and/or mobile device data is optionally occasionally updated. For example, the server 104 occasionally updates the secure element data 132 during non-peak communication hours when the mobile device 102 is not communicating.

In box 226, the secure element data and/or the mobile device data are optionally updated in response to a transaction executed by the smart card application. For example, the server 104 updates the secure element data 132 in response to a transaction executed by the first smart card application 114.

Figure 3:
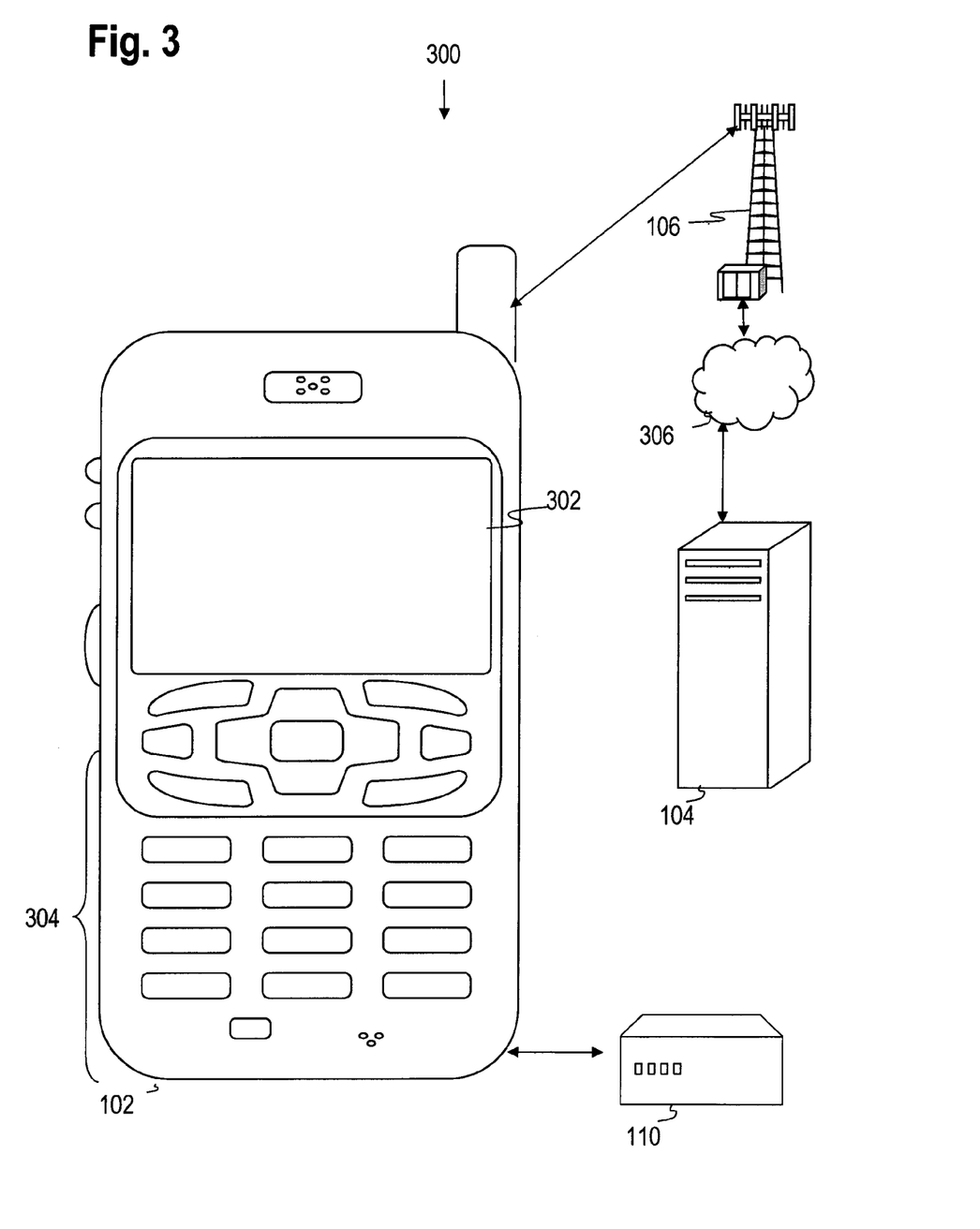
FIG. 3 shows an illustrative wireless communications system.

FIG. 3 shows a wireless communications system 300 including the mobile device 102. FIG. 3 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable mobile devices 102 combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 302 and a touch-sensitive surface or keys 304 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 302 to show a web page. The web page may be obtained via wireless communications with the base transceiver station (BTS) 106, a wireless network access node, a peer mobile device 102 or any other wireless communication network or system. While a single base transceiver station 106 is illustrated, it is understood that the wireless communication system may comprise additional base transceiver stations 106. In some instances, the mobile device 102 may be in communication with multiple base transceiver stations 106 at the same time. The base transceiver station 106 (or wireless network access node) is coupled to a wired network 306, such as the Internet. Via the wireless link and the wired network, the mobile device 102 has access to information on various servers, such as the server 104. The server 104 may provide content that may be shown on the display 302. Alternately, the mobile device 102 may access the base transceiver station 106 through a peer mobile device 102 acting as an intermediary, in a relay type or hop type of connection.

Figure 4:
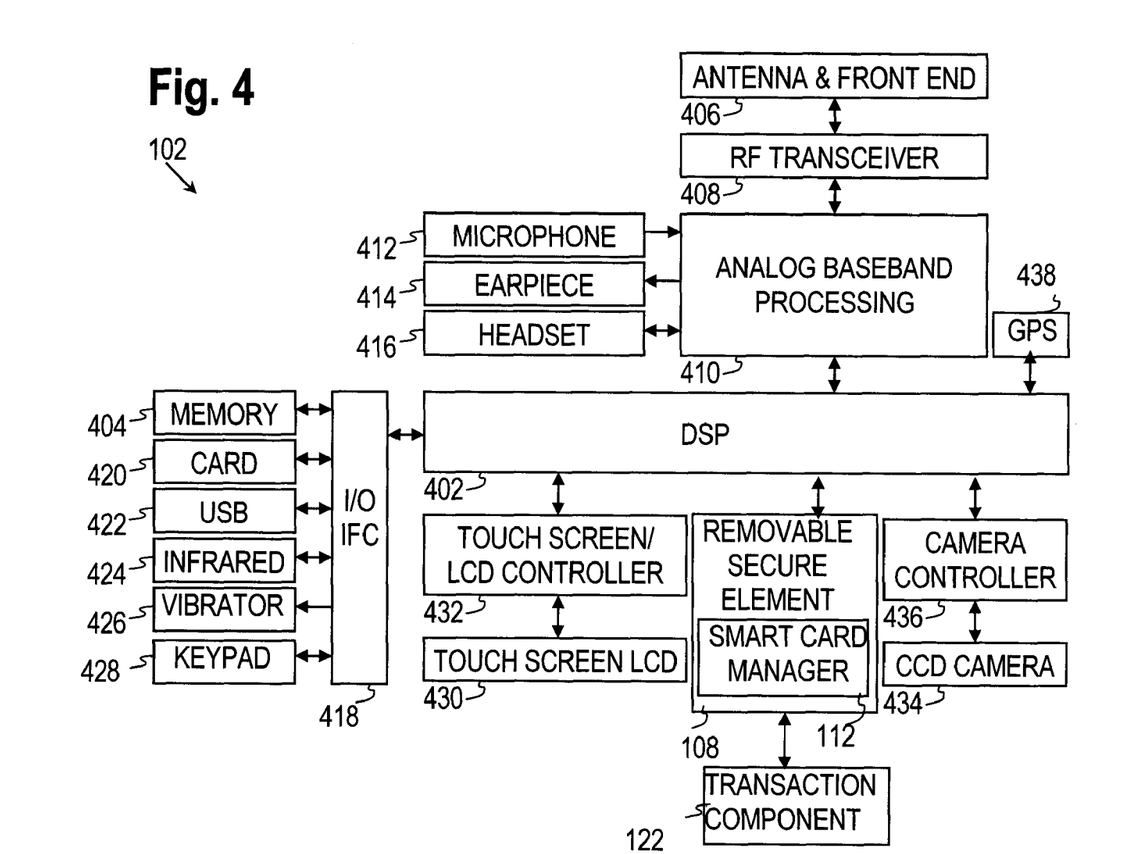
FIG. 4 shows a block diagram of an illustrative mobile device.

FIG. 4 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, a global positioning system (GPS) sensor 438, the removable secure element 108, the smart card manager 112, and the transaction component 122. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a radio access network (RAN) or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a mobile phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast Fourier transforming, and cyclic prefix appending, and for a receiver function the DSP 402 may perform cyclic prefix removal, fast Fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby mobile devices 102 and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 5:
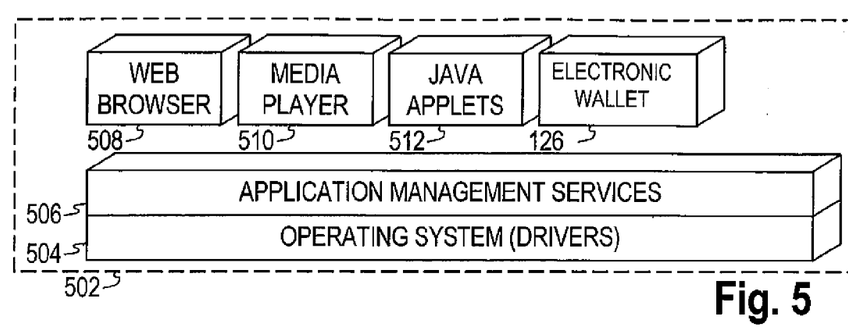
FIG. 5 shows a block diagram of an illustrative software configuration for a mobile device according to some embodiments of the present disclosure.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 102. Also shown in FIG. 5 are a web browser application 508, a media player application 510, JAVA applets 512, and the electronic wallet 126. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality.

Figure 6:
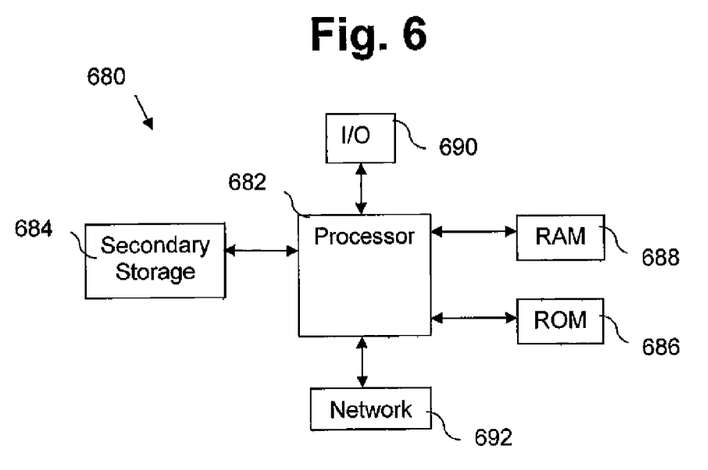
FIG. 6 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for confirming certification of combinations of secure elements and mobile devices, comprising:
    secure element data identifying mobile devices certified for use with the secure element on a removable secure element;
    a plurality of smart card applications on the removable secure element; and
    a secure element component on the removable secure element to detect insertion of the removable secure element in a mobile device, to retrieve the secure element data from the removable secure element, to retrieve mobile device data from the mobile device, to determine whether a combination of the removable secure element and the mobile device is certified based on a comparison of the secure element data and the mobile device data, to provide a certification alert via a user interface on the mobile device in response to a determination that the combination of the removable secure element and the mobile device is not certified, and to selectively restrict access to one or more, but not all, of the plurality of smart card applications stored on the removable secure element by requiring access enabling information to access the one or more of the plurality of smart card applications in response to a determination that the combination of the removable secure element and the mobile device is not certified, wherein access enabling information to access the one or more of the plurality of smart card applications is not required in response to a determination that the combination of the removable secure element and the mobile device is certified.

2. The system of claim 1, further comprising a server to update the secure element data on the removable secure element.

3. A method for confirming certification of combinations of secure elements and mobile devices, comprising:
    detecting insertion of a removable secure element in a mobile device;
    retrieving secure element data identifying mobile devices certified for use with the secure element from the removable secure element;
    retrieving mobile device data from the mobile device;
    determining whether a combination of the removable secure element and the mobile device is certified based on a comparison of the secure element data and the mobile device data; and
    selectively restricting access to one or more, but not all, of a plurality of smart card applications stored on the removable secure element by requiring access enabling information to access the one or more of the plurality of smart card applications in response to a determination that the combination of the removable secure element and the mobile device is not certified, wherein access enabling information to access the one or more of the plurality of smart card applications is not required in response to a determination that the combination of the removable secure element and the mobile device is certified.

4. The method of claim 3, wherein the secure element data comprises at least one of a secure element identifier and data that identifies mobile devices that are certified for the removable secure element.

5. The method of claim 3, wherein the mobile device data comprises at least one of a mobile device identifier and data that identifies removable secure elements that are certified for the mobile device.

6. The method of claim 3, further comprising providing a certification alert via a user interface on the mobile device in response to the determination that the combination of the removable secure element and the mobile device is not certified.

7. The method of claim 6, further comprising requesting user confirmation of the certification alert.

8. The method of claim 3, further comprising requiring a personal identification number (PIN) for approving purchases over a specified amount by the one or more of the plurality of smart card applications.

9. The method of claim 3, wherein the one or more of the plurality of smart card applications are one or more of a loyalty card, an identification card, a credit card, a security card, a debit card, a bank account card, and a cash card.

10. The method of claim 3, further comprising occasionally updating at least one of the secure element data and the mobile device data.

11. The method of claim 3, further comprising updating at least one of the secure element data and the mobile device data in response to at least one of a transaction executed by one of the one or more of the plurality of smart card applications and a determination that the combination of the removable secure element and the mobile device is not certified.

12. A system for confirming certification of combinations of secure elements and mobile devices, comprising:
    mobile device data identifying secure elements certified for use with the mobile device on a mobile device; and
    a mobile device component on the mobile device to detect insertion of a removable secure element in the mobile device, to retrieve secure element data from the removable secure element, to retrieve the mobile device data from the mobile device to compare the secure element data and the mobile device data, to make a first determination whether a combination of the removable secure element and the mobile device is certified based on the comparison of the secure element data and the mobile device data, to provide a certification alert via a user interface on the mobile device when the combination of the removable secure element and the mobile device is determined to be not certified, and to selectively restrict access to one or more, but not all, of a plurality of smart card applications stored on the removable secure element by requiring access enabling information to access the one or more of the plurality of smart card applications when the combination of the removable secure element and the mobile device is determined to be not certified, wherein access enabling information to access the one or more of the plurality of smart card applications is not required in response to a determination that the combination of the removable secure element and the mobile device is certified.

13. The system of claim 12, further comprising a server to update the mobile device data on the mobile device.

14. The system of claim 12, wherein the mobile device component further requests a server to update the secure element data in response to the first determination that the combination of the removable secure element and the mobile device are not certified, compares the updated secure element data and the mobile device data, and makes a second determination whether a combination of the removable secure element and the mobile device is certified based on the comparison of the updated secure element data and the mobile device data.

* * * * *